No. 639,474. Patented Dec. 19, 1899.
R. W. WELTY.
COMBINED STEAMER AND BOILER.
(Application filed June 30, 1899.)
(No Model.)
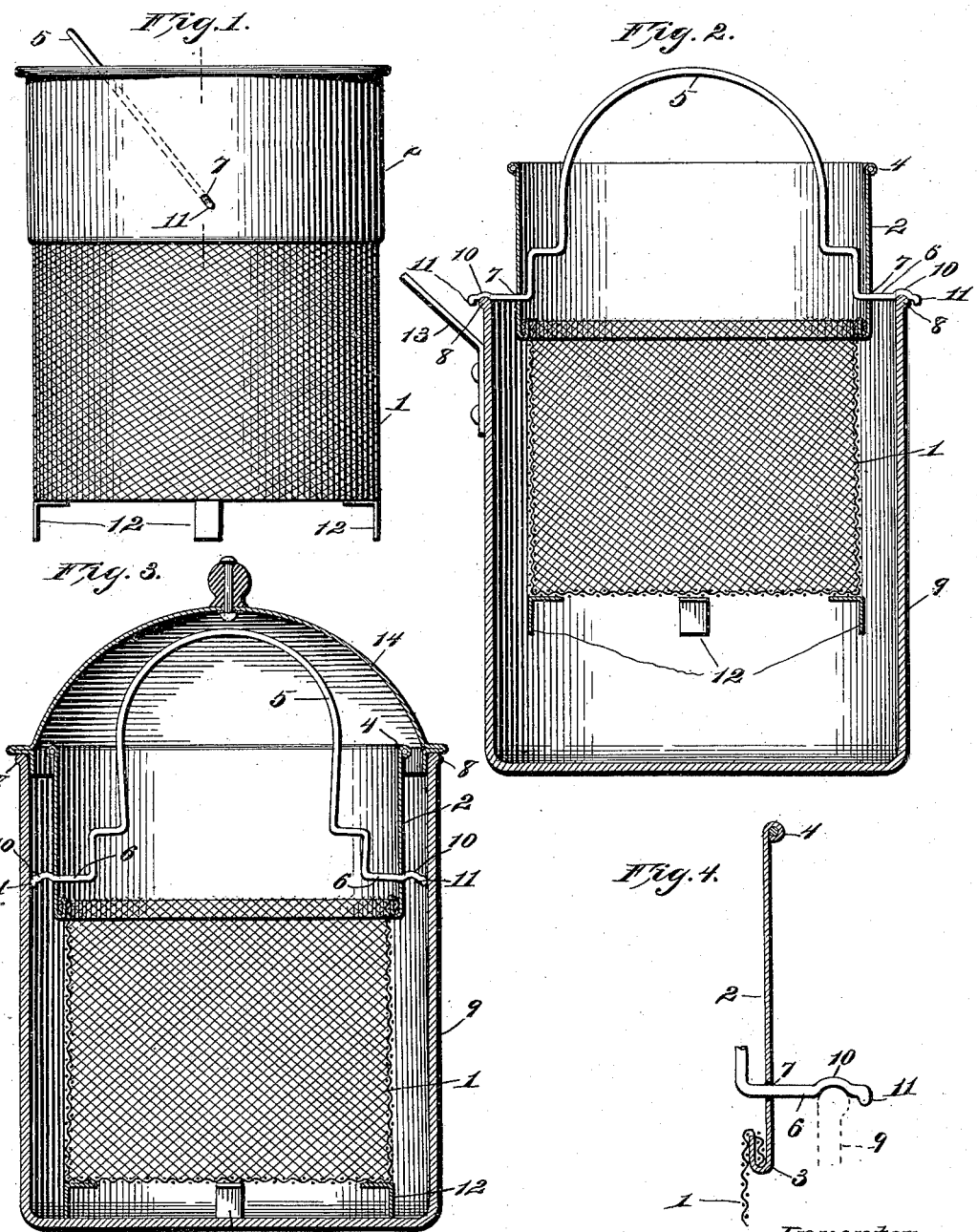
Witnesses:
Louis D. Heinrichs
J. C. McCleary
Inventor
Rufus W. Welty
By Victor J. Evans.
Attorney

UNITED STATES PATENT OFFICE.

RUFUS W. WELTY, OF SAN FRANCISCO, CALIFORNIA.

COMBINED STEAMER AND BOILER.

SPECIFICATION forming part of Letters Patent No. 639,474, dated December 19, 1899.

Application filed June 30, 1899. Serial No. 722,478. (No model.)

*To all whom it may concern:*

Be it known that I, RUFUS W. WELTY, a citizen of the United States, residing at San Francisco, in the county of San Francisco and State of California, have invented certain new and useful Improvements in a Combined Steamer and Boiler; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to culinary vessels, and more particularly to a combined steamer and boiler adapted especially for domestic use.

The primary object of the invention is to provide a combined steamer and boiler comprising an inner and an outer vessel, with simple and inexpensive means for supporting the inner vessel in raised position for use as a steamer and for permitting it to be lowered to rest upon the bottom of the outer vessel when desired for use as a boiler.

The main characteristic feature of my invention is that the bail by which the inner vessel is lifted also serves to support said inner vessel in elevated position with relation to the outer vessel.

A further important feature of the invention is that any ordinary pot or cooking vessel may be employed as the outer vessel of my steamer and boiler, no special size or construction of the outer vessel being necessary.

The construction of the improvement will be fully described hereinafter in connection with the accompanying drawings, and the invention defined in the appended claims.

In the drawings, Figure 1 is a side elevation of the inner vessel of the steamer and boiler. Fig. 2 is a vertical section of the same supported in elevated position within the outer vessel. Fig. 3 is a vertical section showing the inner vessel lowered in position and with a lid or cover in place upon the outer vessel, and Fig. 4 is a detail sectional view on the line 4 4 of Fig. 1.

The inner vessel consists of a lower portion or body 1, of wire-netting or like material, and an upper section or rim 2, preferably made of imperforate sheet metal and joined to the upper edge of the body 1 by bending the rim at its lower edge, as shown at 3 in Fig. 4. The upper edge of the rim 2 is formed with a bead 4.

5 designates a bail of spring-wire having its ends 6 bent outward at substantially right angles. These ends 6 extend through diametrically opposite openings 7, formed in the rim 2, near the lower edge thereof, and are adapted to rest upon the top edge 8 of the outer vessel 9, as shown in Fig. 2. If desired, the ends 6 of the bail may be formed with bends 10 to fit over the beaded edge of the outer vessel 9, and their extremities 11 are preferably bent downwardly and rounded to adapt them to slide freely in contact with the inner surface of the vessel 9 when the inner vessel is lowered to the position shown in Fig. 3. The bends 10 also serve as stops to prevent the ends of the bail from disengagement with the inner vessel when forced inward.

I preferably provide the bottom of the inner vessel with feet 12 to support it slightly above the bottom of the outer vessel. The outer vessel 9 is provided with the usual handle 13 and with a lid or cover 14, which serves also as a cover for the inner vessel when the latter is in its elevated position. This cover, as shown in Fig. 3, is of sufficient depth to accommodate the bail 5 when the inner vessel is lowered.

The utility and operation of the improvement as above described will be readily understood. When it is desired to employ the inner vessel as a steamer, the said vessel is raised and supported in elevated position by the ends of the bail, which rest upon the top edge of the vessel 9. To lower the inner vessel to the position shown in Fig. 3, it is only necessary to grasp the sides of the bail and press them inward, thus disengaging the bail ends from the edge of the vessel 9 and causing their rounded extremities 11 to contact with the inner surface of the outer vessel, after which the inner vessel may be easily forced downward until its feet rest upon the bottom of the vessel 9. The device is then in position for use as a boiler.

It will be apparent that any ordinary pot or stewer may be utilized as the outer vessel and that the bail constitutes a convenient and effective suspending device for the steamer.

The inner perforated vessel may be utilized as a strainer for soups and the like when so desired.

I claim—

1. A combined steamer and boiler comprising an outer and an inner vessel, the latter being formed with diametrically opposite openings in combination with a spring-bail adapted to permit the inner vessel to be lowered into the outer vessel having its ends bent outward to extend through said openings and engage the top edge of the outer vessel and having its extremities rounded for the purpose described.

2. The combination with an outer and an inner vessel, the latter having diametrically opposite openings of a spring-bail adapted to permit the inner vessel to be lowered into the outer vessel having its ends bent outward and formed with stops.

In testimony whereof I affix my signature in presence of two witnesses.

RUFUS W. WELTY.

Witnesses:
GRACE D. WITTER,
HUGH M. STERLING.